United States Patent
Ishizawa et al.

(10) Patent No.: US 12,179,278 B2
(45) Date of Patent: Dec. 31, 2024

(54) MULTILAYER GRINDSTONE FOR GEAR GRINDING

(71) Applicants: NORITAKE CO., LIMITED, Nagoya (JP); NORITAKE COATED ABRASIVE CO., LTD., Nagoya (JP)

(72) Inventors: Takamasa Ishizawa, Nagoya (JP); Yusuke Oura, Nagoya (JP); Masayuki Hattori, Nagoya (JP); Yasuhiro Kamiya, Nagoya (JP); Koshi Hashimoto, Miyoshi (JP)

(73) Assignees: NORITAKE CO., LIMITED, Nagoya (JP); NORITAKE COATED ABRASIVE CO., LTD., Nagoya (JP)

( * ) Notice: Subject to any disclaimer, the term of this patent is extended or adjusted under 35 U.S.C. 154(b) by 339 days.

(21) Appl. No.: 17/638,265

(22) PCT Filed: Jul. 17, 2020

(86) PCT No.: PCT/JP2020/027962
§ 371 (c)(1),
(2) Date: Feb. 25, 2022

(87) PCT Pub. No.: WO2021/039195
PCT Pub. Date: Mar. 4, 2021

(65) Prior Publication Data
US 2022/0347774 A1    Nov. 3, 2022

(30) Foreign Application Priority Data
Aug. 29, 2019  (JP) .................................. 2019-157443

(51) Int. Cl.
*B23F 21/02*  (2006.01)
*B23F 5/04*  (2006.01)
(Continued)

(52) U.S. Cl.
CPC .............. *B23F 21/026* (2013.01); *B23F 5/04* (2013.01); *B24D 3/28* (2013.01); *B24D 5/14* (2013.01)

(58) Field of Classification Search
CPC . B23F 21/026; B23F 5/04; B24D 3/28; B24D 5/14; B24D 5/066; B24D 13/08; B24D 13/142
(Continued)

(56) References Cited

U.S. PATENT DOCUMENTS

| | | | |
|---|---|---|---|
| 4,961,289 A | 10/1990 | Sulzer | |
| 2004/0055223 A1* | 3/2004 | Ono | B24D 3/28 51/293 |

(Continued)

FOREIGN PATENT DOCUMENTS

| | | |
|---|---|---|
| CN | 103476528 A | 12/2013 |
| DE | 102007036000 A1 | 2/2009 |

(Continued)

OTHER PUBLICATIONS

Sep. 12, 2023 Extended Search Report issued in European Patent Application No. 20857670.2.

(Continued)

*Primary Examiner* — Laura C Guidotti
*Assistant Examiner* — Caleb Andrew Holizna
(74) *Attorney, Agent, or Firm* — Oliff PLC

(57) ABSTRACT

A gear-grinding multilayer grindstone includes: a first thread-shaped grindstone and a second thread-shaped grindstone that are fixed to each other, such that the first and second thread-shaped grindstones have a rotational axis that is common to the first and second thread-shaped grindstones; and a thread-shaped groove that is provided in a first outer circumferential surface of the first thread-shaped grindstone and a second outer circumferential surface of the (Continued)

second thread-shaped grindstone. The thread-shaped groove extends continuously over the first outer circumferential surface and the second outer circumferential surface. The second thread-shaped grindstone is constituted by abrasive cloths that are laminated on each other, and has a higher elasticity than the first thread-shaped grindstone.

8 Claims, 6 Drawing Sheets

(51) Int. Cl.
 *B24D 3/28* (2006.01)
 *B24D 5/14* (2006.01)
(58) Field of Classification Search
 USPC .................................................. 451/541, 547
 See application file for complete search history.

(56) References Cited

U.S. PATENT DOCUMENTS

| | | | |
|---|---|---|---|
| 2010/0261415 A1 | 10/2010 | Wawro | |
| 2014/0141699 A1 | 5/2014 | Yanase et al. | |
| 2014/0349557 A1* | 11/2014 | Mizuno | B24D 5/06 451/542 |
| 2016/0059332 A1* | 3/2016 | Nuriya | B23F 21/026 451/250 |
| 2016/0107291 A1* | 4/2016 | Ozaki | B24B 55/02 451/47 |
| 2017/0197263 A1 | 7/2017 | Yanase et al. | |
| 2017/0312838 A1* | 11/2017 | Mueller | B23F 1/023 |
| 2019/0270922 A1* | 9/2019 | Adefris | C09K 3/1418 |

FOREIGN PATENT DOCUMENTS

| | | |
|---|---|---|
| JP | S49-100296 U | 8/1974 |
| JP | 2013-018089 A | 1/2013 |
| JP | 2013-018117 A | 1/2013 |
| JP | 2015-016522 A | 1/2015 |
| JP | 2016-163912 A | 9/2016 |
| JP | 2019-119040 A | 7/2019 |

OTHER PUBLICATIONS

Sep. 24, 2020 International Search Report issued in International Patent Application No. PCT/JP2020/027962.
Sep. 24, 2020 Written Opinion issued in International Patent Application No. PCT/JP2020/027962.
May 17, 2022 Office Action issued in Japanese Patent Application No. 2019-157443.
Apr. 1, 13, 2023 Office Action Issued in Chinese Patent Application No. 202080060969.1.

\* cited by examiner

FIG.4

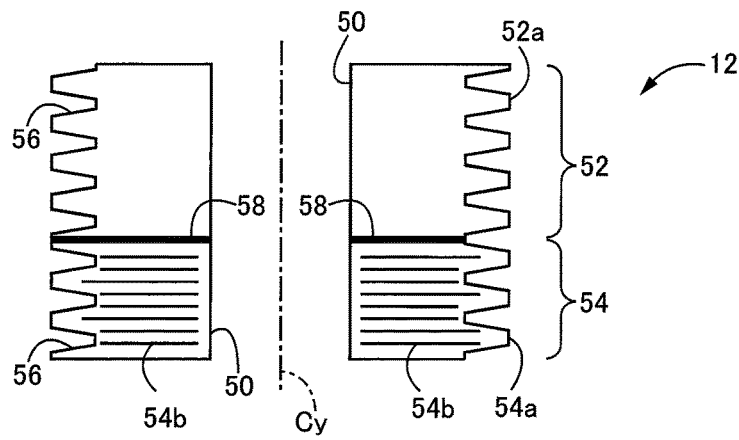

FIG.5

| SAMPLE NO. | ROUGH-MACHINING GRINDSTONE PORTION | FINISH-MACHINING GRINDSTONE PORTION | GRAIN SIZE | BENDING ELASTIC MODULUS (Gpa) | ABRASIVE-GRAIN VOLUME RATIO (vol%) | MACHINING RESULT | SURFACE ROUGHNESS (Ra) AFTER MACHINING |
|---|---|---|---|---|---|---|---|
| 1 | VITRIFIED GRINDSTONE | — | F120 | — | — | — | 0.3885 |
| 2 | VITRIFIED GRINDSTONE | NON-WOVEN FABRIC LAMINATED GRINDSTONE | F800 | 0.2 | 15 | EXCELLENT | 0.0615 |
| 3 | VITRIFIED GRINDSTONE | NON-WOVEN FABRIC LAMINATED GRINDSTONE | F180 | 0.2 | 15 | POOR | 0.2246 |
| 4 | VITRIFIED GRINDSTONE | NON-WOVEN FABRIC LAMINATED GRINDSTONE | F220 | 0.2 | 15 | GOOD | 0.1407 |
| 5 | VITRIFIED GRINDSTONE | NON-WOVEN FABRIC LAMINATED GRINDSTONE | F2000 | 0.2 | 15 | GOOD | 0.1134 |
| 6 | VITRIFIED GRINDSTONE | NON-WOVEN FABRIC LAMINATED GRINDSTONE | F3000 | 0.2 | 15 | POOR | 0.2319 |
| 7 | VITRIFIED GRINDSTONE | NON-WOVEN FABRIC LAMINATED GRINDSTONE | F800 | 0.01 | 15 | POOR | 0.3174 |
| 8 | VITRIFIED GRINDSTONE | NON-WOVEN FABRIC LAMINATED GRINDSTONE | F800 | 0.05 | 15 | GOOD | 0.1921 |
| 9 | VITRIFIED GRINDSTONE | NON-WOVEN FABRIC LAMINATED GRINDSTONE | F800 | 1 | 15 | GOOD | 0.1676 |
| 10 | VITRIFIED GRINDSTONE | NON-WOVEN FABRIC LAMINATED GRINDSTONE | F800 | 1.2 | 15 | POOR | EXCESSIVELY HIGH LOAD |
| 11 | VITRIFIED GRINDSTONE | NON-WOVEN FABRIC LAMINATED GRINDSTONE | F800 | 0.2 | 0.5 | POOR | 0.2461 |
| 12 | VITRIFIED GRINDSTONE | NON-WOVEN FABRIC LAMINATED GRINDSTONE | F800 | 0.2 | 1.0 | GOOD | 0.1893 |
| 13 | VITRIFIED GRINDSTONE | NON-WOVEN FABRIC LAMINATED GRINDSTONE | F800 | 0.2 | 20 | EXCELLENT | 0.0867 |
| 14 | VITRIFIED GRINDSTONE | NON-WOVEN FABRIC LAMINATED GRINDSTONE | F800 | — | 25 | POOR | NON-PRODUCIBLE |

(MACHINING CONDITION)

| MACHINING CONDITION ITEM | UNIT | SET VALUE | | |
|---|---|---|---|---|
| PROCESS NAME | (-) | ROUGH MACHINING | INTERMEDIATE FINISH MACHINING | FINAL FINISH MACHINING |
| CUTTING DIRECTION | (-) | CLIMB | CONVENTIONAL | CLIMB |
| GRINDSTONE ROTATIONAL SPEED | (rpm) | 4400 | 4400 | 4400 |
| CUTTING DEPTH AMOUNT | (mm) | 0.24 | 0.04 | 0.0001 |
| AXIAL GENERATION FEED RATE | (mm/t.rev) | 0.7 | 0.3 | 0.1 |

MULTILAYER GRINDSTONE FOR GEAR GRINDING

TECHNICAL FIELD

The present invention relates to a multilayer grindstone for gear grinding, which is capable of grinding a gear at a high speed.

BACKGROUND ART

In a transmission for a vehicle and a speed reducer for an industrial robot, for example, many gears are used. These gears, particularly, helical gears are required to have improved performances such as reduction of vibration and noise, improvement of transmission efficiency and extension of service life, for example, with demands for more silent vehicles and improved fuel economy of vehicles in recent years. Further, the gears are required to be machined for a shorter length of time in an actual gear machining operation, in addition to the above-described improved performances.

On the other hand, there has been proposed a multilayer grindstone for gear grinding, which is constituted integrally by a first thread-shaped grindstone and a second thread-shaped grindstone, wherein the first and second thread-shaped grindstones serve as a rough-machining grindstone portion and a finish-machining grindstone portion, respectively, which are fixed to each other on a rotational axis. Such a gear-grinding multilayer grindstone is used, for example, in a continuous-generation gear grinding machine, so that a machining operation is performed by the second thread-shaped grindstone after a machining operation performed by the first thread-shaped grindstone, for the purposed of improving roughness of a gear tooth surface. The first and second thread-shaped grindstones, which constitute the gear-grinding multilayer grindstone, are different from each other in terms of kind and grain size of abrasive grains, kind and binding degree of a binder, and porosity. Thus, the first and second thread-shaped grindstones are different in physical characteristics, so as to satisfactorily perform relatively rough and finish machining operations, respectively, and so as to enable the gear-grinding multilayer grindstone to perform the machining operations at high speeds while maintaining high performance in the machining operations. The second thread-shaped grindstone is constituted by a grindstone such as a resinoid grindstone which has a relatively high elasticity. With use of the gear-grinding multilayer grindstone, it is possible to solve a problem that a machining axis is offset due to attachment/detachment of a gear blank, which could be caused in a case where the rough and finish machining operations are performed in respective grinding machines.

PRIOR ART DOCUMENT

Patent Document

Patent Document 1: JP2013-18089A

SUMMARY OF THE INVENTION

Object to be Achieved by the Invention

By the way, the above-described conventional gear-grinding multilayer grindstone has a drawback that, in a high rotational speed range during a highly efficient grinding operation, the second thread-shaped grindstone having a relatively high elasticity is displaced in a radial direction due to a centrifugal force whereby the grinding operation could be made with a grinding depth larger than a desired depth value, thereby resulting in lack of stability in accuracy in the grinding operation. Further, for solving this drawback, there is a problem that a complicated control is required to control the grinding depth in a manner for compensating the displacement of the second thread-shaped grindstone in the radial direction which is caused with rotation of the multilayer grindstone. It is considered that this problem is likely to be more prominent since the gear-grinding multilayer grindstone is expected to be driven at higher speeds with downsizing of gears.

The present invention was made in view of the background discussed above. It is therefore an object of the present invention to provide a multilayer grindstone for gear grinding, which is capable of stabilizing grinding accuracy and roughness of a gear tooth surface in a grinding operation performed by a second thread-shaped grindstone even in a high rotational speed range.

The present inventors and their collaborators noted that a grinding force becomes excessively high for use of the second thread-shaped grindstone as the finish-machining grindstone portion when the displacement is caused during the rotation at a high speed, and that the excessively high grinding force is a factor causing the above-descried drawback of the conventional gear-grinding multilayer grindstone in which the second thread-shaped grindstone that is constituted by the resinoid grindstone. They thought that, even in presence of the displacement during the rotation at a high speed, if the grinding force is made lower than in the conventional resinoid grindstone and if an influence of the displacement can be absorbed by the second thread-shaped grindstone during the gear machining operation, it will be possible to provide only an appropriate polishing effect. They made various studies about a material and a structure which provide a higher elasticity and a lower grinding force than the resinoid grindstone, for enabling the influence of the displacement during the gear machining operation to be absorbed by the second thread-shaped grindstone. As results of the various studies, they found a fact that it is possible to obtain a grindstone capable of making the grinding force small in spite of the high elasticity and enabling the grindstone to absorb the influence of the displacement during the gear machining operation, by constituting the second thread-shaped grindstone by a fibrous-substrate laminated grindstone including fibrous substrate sheets to each of which adhesive containing mixture of abrasive grains and synthetic resin is applied and cured, such that the fibrous substrate sheets are laminated on each other in a thickness direction of the fibrous substrate sheets, wherein each of the fibrous substrate sheets is a woven fabric or non-woven fabric that is constituted by synthetic fiber or glass fiber. The present invention was made based on such a finding.

Measures for Solving the Problem

That is, the gist of a first aspect of the present invention is that, in a multilayer grindstone for gear grinding, the multilayer grindstone comprising: a first thread-shaped grindstone and a second thread-shaped grindstone that are fixed to each other, such that the first and second thread-shaped grindstones have a rotational axis that is common to the first and second thread-shaped grindstones; and a thread-shaped groove that is provided in a first outer circumferential surface of the first thread-shaped grindstone and a second outer circumferential surface of the second thread-shaped grindstone, such that the thread-shaped groove extends continuously over the first outer circumferential surface and the second outer circumferential surface, the second thread-shaped grindstone is constituted by abrasive cloths that are laminated on each other, and has a higher elasticity than the first thread-shaped grindstone.

Effects of the Invention

According to the gear-grinding multilayer grindstone of the present invention, the second thread-shaped grindstone is constituted by the abrasive cloths that are laminated on each other, and has the higher elasticity than the first thread-shaped grindstone. Owing to this feature, it becomes possible to enable the gear-grinding multilayer grindstone to absorb the influence of the displacement caused by the rotation, without the gear tooth surface being affected by the displacement, even in a high rotational speed range, so as to stabilize grinding accuracy and roughness of the gear tooth surface in a grinding operation performed by the second thread-shaped grindstone.

Preferably, the first thread-shaped grindstone is a vitrified grindstone in which abrasive grains have a grain size of F80 to F180. Where the gear-grinding multilayer grindstone is used in a continuous-generation gear grinding operation, it is possible to reduce length of grinding swarf, so as to facilitate evacuation of the grinding swarf and to suppress grinding burn, by setting the grain size of the abrasive grains of the first thread-shaped grindstone, to F80 to F180.

Further, preferably, the second thread-shaped grindstone is a fibrous-substrate laminated grindstone in which the abrasive cloths are laminated on each other in a thickness direction of the abrasive cloths and which are fixed to each other, such that each of the abrasive cloths includes adhesive in which synthetic resin and abrasive grains are mixed. Owing to this feature, the second thread-shaped grindstone has a higher elasticity than the first thread-shaped grindstone, and it becomes possible to enable the gear-grinding multilayer grindstone to absorb the influence of the displacement caused by the rotation, without the gear tooth surface being affected by the displacement, even in a high rotational speed range, so as to stabilize the grinding accuracy and the roughness of the gear tooth surface in a grinding operation performed by the second thread-shaped grindstone of the gear-grinding multilayer grindstone.

Further, preferably, in each of the abrasive cloths, the adhesive is applied to a fibrous substrate sheet that is constituted by at least one kind of fibers selected from among nylon 6, nylon 66, polyester, polypropylene, acrylonitrile, rayon, cellulose acetate, cotton, wool and hemp. With use of the above-described fiber, the inside of the substrate sheet has a three-dimensional network structure in which the fibers are intricately entwined. Thus, even in the second thread-shaped grindstone in which the adhesive is applied to the fibrous substrate sheets and the fibrous substrate sheets are laminated on each other, the three-dimensional network structure of each of the fibrous substrate sheets remains, so that the second thread-shaped grindstone has more pores than the conventional resinoid grindstone. In the conventional resinoid grindstone, there is no pore or a limited number of pores so that the displacement during the gear machining operation is mainly limited to deformation of a resin portion that is a binder. As compared with the conventional resinoid grindstone, the fibrous-substrate laminated grindstone has a multiplicity of pores, so that the displacement during the gear machining operation can be made by deformation of each of the pores and also deformation of each of the fibrous substrate sheets as such. Therefore, as compared with the resinoid grindstone, the second thread-shaped grindstone has a higher elasticity so as to able to absorb the influence of the displacement caused during the rotation at a high speed, without the gear tooth surface being affected by the displacement, so that the roughness of the gear tooth surface is stabilized in the grinding operation performed by the second thread-shaped grindstone of the gear-grinding multilayer grindstone. Further, since the second thread-shaped grindstone has the high elasticity than the first thread-shaped grindstone, it becomes possible to enable the gear-grinding multilayer grindstone to absorb the influence of the displacement caused by the rotation, without the gear tooth surface being affected by the displacement, even in a high rotational speed range, so as to stabilize the grinding accuracy and the roughness of the gear tooth surface in the grinding operation performed by the second thread-shaped grindstone of the gear-grinding multilayer grindstone.

Further, preferably, the synthetic resin included in the adhesive is constituted by one of epoxy resin, urethane resin, phenol resin, melamine resin and acrylic resin. Owing to this feature, the synthetic resin included in the adhesive fixes between the fibrous substrate sheets, thereby making it possible to increase durability.

Further, preferably, the second thread-shaped grindstone is constituted by the abrasive cloths that are laminated on each other in a direction of the rotational axis. Owing to this feature, a bonding direction of the fibrous substrate sheets is perpendicular to a direction of a centrifugal force that is generated to act toward an outer peripheral side during the rotation, so that it is possible to increase durability against separation of the fibrous substrate sheets due to the centrifugal force. Further, since the abrasive cloths are laminated in the direction of the rotational axis, it is possible to more effectively suppress the displacement during the rotation, than in an arrangement in which the abrasive cloths are bonded in a direction parallel to the direction of the centrifugal force. Owing to this feature, it becomes possible to enable the gear-grinding multilayer grindstone to absorb the influence of the displacement caused by the rotation, without the gear tooth surface being affected by the displacement, even in a high rotational speed range, so as to stabilize the grinding accuracy and the roughness of the gear tooth surface in the grinding operation performed by the second thread-shaped grindstone of the gear-grinding multilayer grindstone.

Further, preferably, abrasive grains of the second thread-shaped grindstone have a grain size of F220 to F2000, and are finer than abrasive grains of the first thread-shaped grindstone. Owing to this feature, the abrasive grains of the second thread-shaped grindstone are finer than the abrasive grains of the first thread-shaped grindstone, so that the roughness of the surface of the gear blank can be improved. If the grain size is finer than F2000, the grinding performance would be considerably reduced thereby making impossible to finish the surface with a target polishing roughness.

Further, preferably, the second thread-shaped grindstone has a bending elastic modulus of 0.05 to 1.0 Gpa. More preferably, the bending elastic modulus of the second thread-shaped grindstone is 0.1 to 0.4 Gpa. Owing to this feature, a satisfactory polishing surface can be obtained.

Further, preferably, a ratio of content of abrasive grains in the second thread-shaped grindstone is 1.0 to 20 vol %. Owing to this feature, optimum polishing force and elastic modulus can be obtained.

Further, preferably, the multilayer grindstone is to be used in a continuous-generation gear grinding operation, and the continuous-generation gear grinding operation is to be executed to form teeth in an outer circumferential surface of a gear blank, by displacing the multilayer grindstone in a direction of the rotational axis while rotating the multilayer grindstone about the rotational axis, and performing reciprocating grinding feed of the multilayer grindstone in a direction parallel to a rotational axis of the gear blank while sequentially rotating the gear blank about the rotational axis of the gear blank, such that rotation of the gear blank is synchronized with the reciprocating grinding feed of the multilayer grindstone. Owing to this feature, the gear grinding operation can be performed on the gear blank with high efficiency and high accuracy.

BRIEF DESCRIPTION OF DRAWINGS

FIG. 4 A cross sectional view for explaining construction of the gear-grinding multilayer grindstone of FIG. 2.

FIG. 5 A view showing results of measurements of bending elastic modulus of samples 1-14 and also results of gear grinding tests using the samples 1-14.

MODES FOR CARRYING OUT THE INVENTION

Hereinafter, there will be described an embodiment of the present invention, in detail with reference to the drawings.

Embodiment

Figure 1:
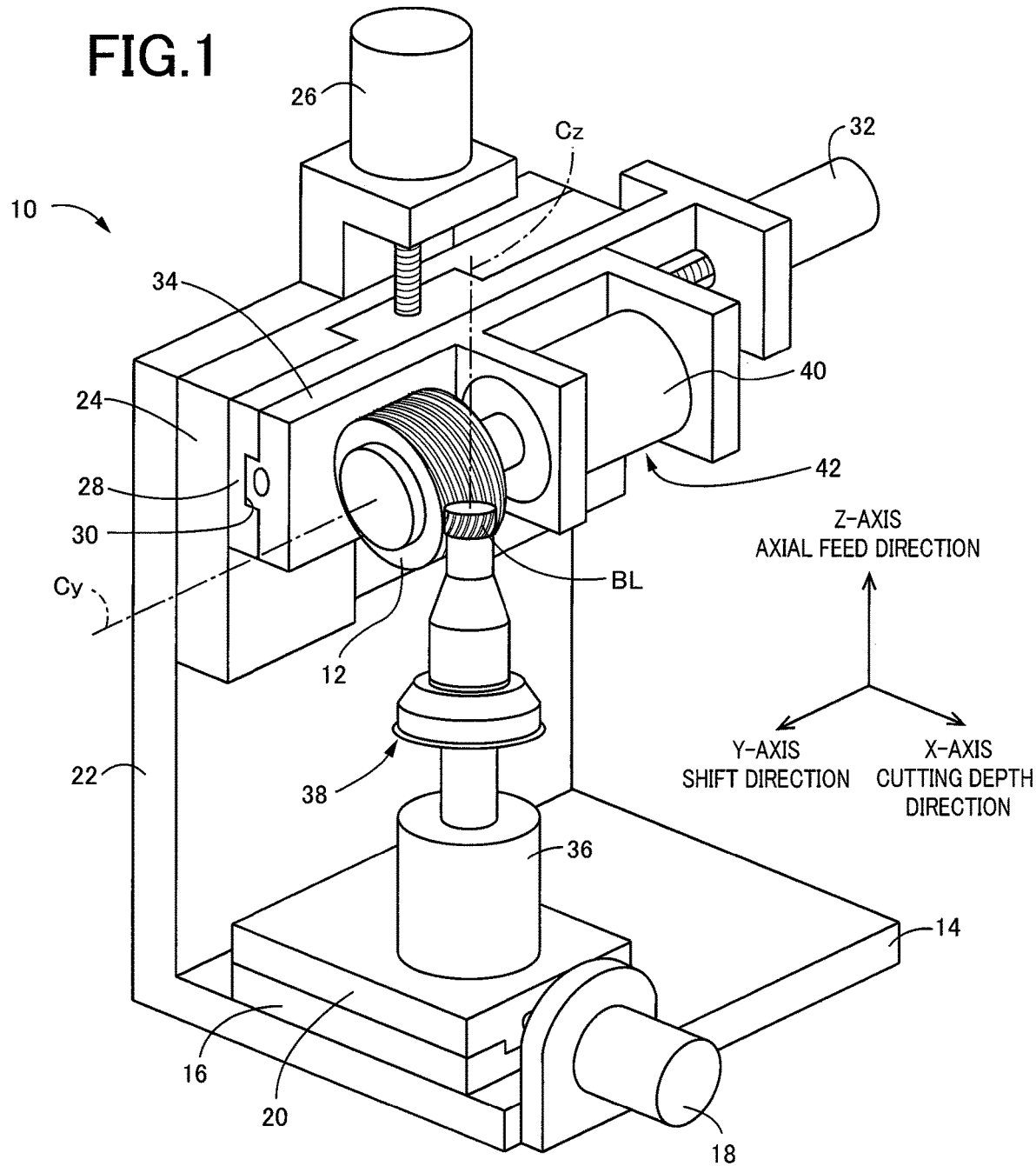
FIG. 1 A perspective view for explaining constructions of major portions of a continuous-generation gear grinding machine in an embodiment of the present invention.
Figure 2:
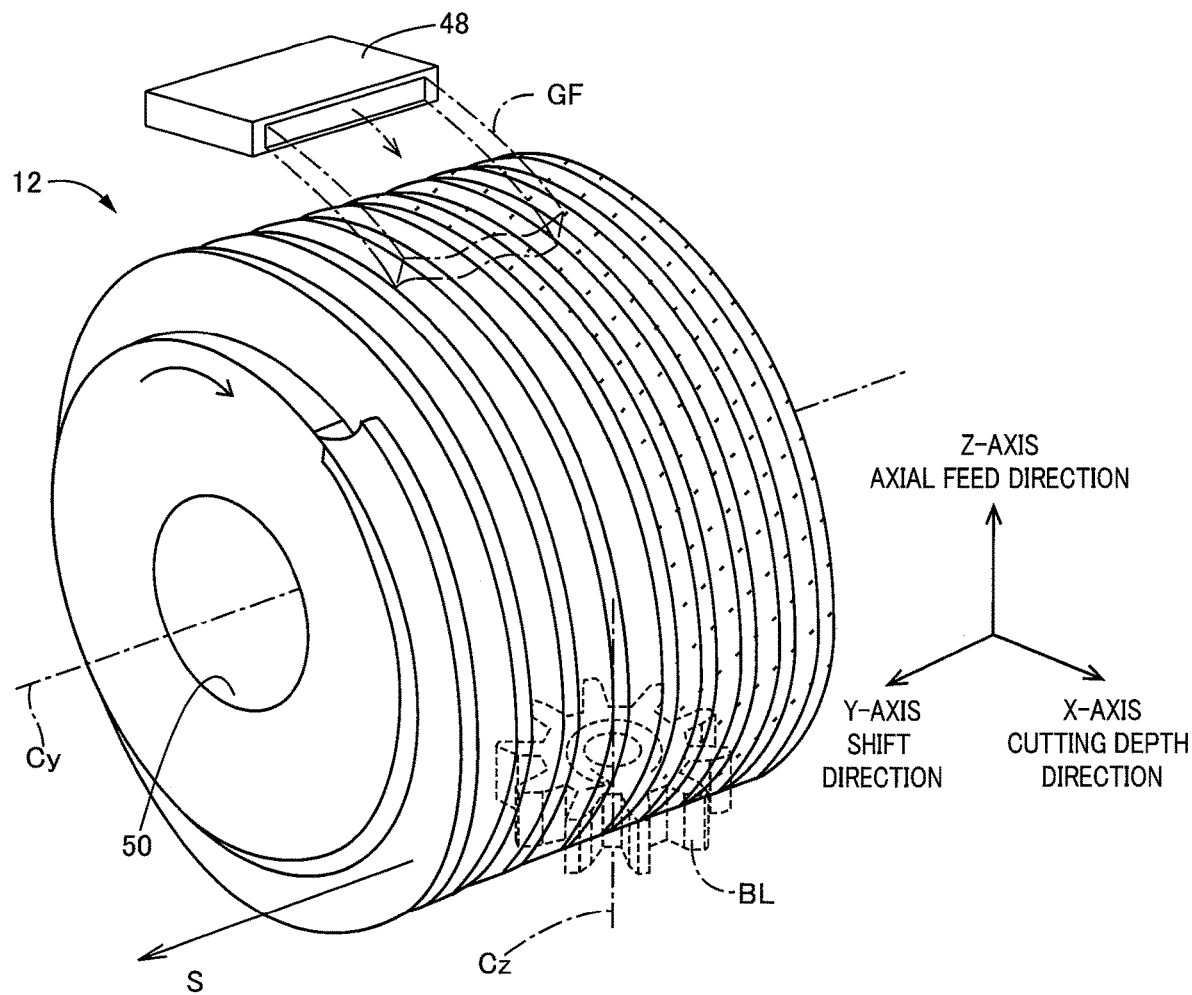
FIG. 2 A perspective view for explaining a continuous-generation gear grinding operation performed on a gear blank by a gear-grinding multilayer grindstone in the continuous-generation gear grinding machine of FIG. 1.

FIG. 1 is a perspective view for explaining constructions of major portions of a continuous-generation gear grinding machine 10 in an embodiment of the present invention. FIG. 2 is a perspective view for explaining a continuous-generation gear grinding operation performed on a gear blank BL by a gear-grinding multilayer grindstone 12 in the continuous-generation gear grinding machine 10 of FIG. 1. In the continuous-generation gear grinding machine 10, the continuous-generation gear grinding operation, which is referred to as so-called shift grinding, is performed on an outer circumferential surface of the gear blank BL, by using the thread-shaped gear-grinding multilayer grindstone 12. The continuous-generation gear grinding machine 10 is constructed, for example, such that the gear-grinding multilayer grindstone 12 is rotatable about a rotational axis Cy that is parallel to a Y-axis extending in a horizontal direction, and is movable relative to the gear blank BL, in a shift direction S, i.e., a direction of the rotational axis Cy parallel to the Y-axis, in an axial feed direction parallel to a Z-axis direction that is orthogonal to the Y-axis, and in a cutting depth direction parallel to an X-axis direction that is orthogonal to the Y-axis and Z-axis. The gear-grinding multilayer grindstone 12 has a thread shape, with a helically-extending groove being provided in its outer circumferential grinding surface. Further, the continuous-generation gear grinding machine 10 holds the gear blank BL such that the gear blank BL is rotatable about a rotational axis Cz that is parallel to the Z axis.

Specifically, the continuous-generation gear grinding machine 10 includes an X-axis table 20, a Z-axis table 28, a Y-axis table 34, a work rotation drive device 38 and a grindstone rotation drive device 42. The X-axis table 20 is guided in the X-axis direction by an X-axis-direction guide member 16 that is fixed on a base 14, and is to be positioned in the X-axis direction by an X-axis-direction positioning motor 18. The Z-axis table 28 is guided in the Z-axis direction by a Z-axis-direction guide member 24 that is fixed to a support wall 22 vertically extending from the base 14, and is to be positioned in the Z-axis direction by a Z-axis-direction positioning motor 26. The Y-axis table 34 is guided in the Y-axis direction by a Y-axis-direction guide groove 30 that is provided in the Z-axis table 28, and is to be positioned in the Y-axis direction by a Y-axis-direction positioning motor 32. The work rotation drive device 38 is fixedly disposed on the X-axis table 20, and is configured to rotatably hold the gear blank BL. The work rotation drive device 38 includes a work driving motor 36 configured to drive and rotate the gear blank BL about the rotational axis Cz. The grindstone rotation drive device 42 is fixedly disposed on the Y-axis table 34, and is configured to rotatably hold the gear-grinding multilayer grindstone 12. The grindstone rotation drive device 42 includes a grindstone driving motor 40 configured to drive and rotate the gear-grinding multilayer grindstone 12 about the rotational axis Cy.

The continuous-generation gear grinding machine 10 is configured to drive the X-axis table 20, Z-axis table 28 and Y-axis table 34 by the X-axis-direction positioning motor 18, Z-axis-direction positioning motor 26 and Y-axis positioning motor 32, in accordance with a pre-stored program, so as to feed the gear-grinding multilayer grindstone 12 in the direction of the rotational axis Cy, i.e., the shift direction S, while rotating the gear-grinding multilayer grindstone 12 about the rotational axis Cy, and performing reciprocating grinding feed of the gear-grinding multilayer grindstone 12 with a predetermine grinding stroke in an axial direction, i.e., the Z-axis direction parallel to the rotational axis Cz of the gear blank BL as a workpiece while sequentially rotating the gear blank BL about the rotational axis Cz of the gear blank BL, such that rotation of the gear blank BL is synchronized with the reciprocating grinding feed of the gear-grinding multilayer grindstone 12. Further, with presence of a grinding fluid GF supplied widely from a coolant nozzle 48, helical teeth or straight teeth on the outer circumferential surface of the gear blank BL are ground by a constantly new grinding surface and constantly new abrasive grains of the gear-grinding multilayer grindstone 12, so that the continuous-generation gear grinding operation is performed on the outer circumferential surface of the gear blank BL, with a stable accuracy and a high machining accuracy, and with suppressed wear of the abrasive grains of the gear-grinding multilayer grindstone 12.

Figure 3:
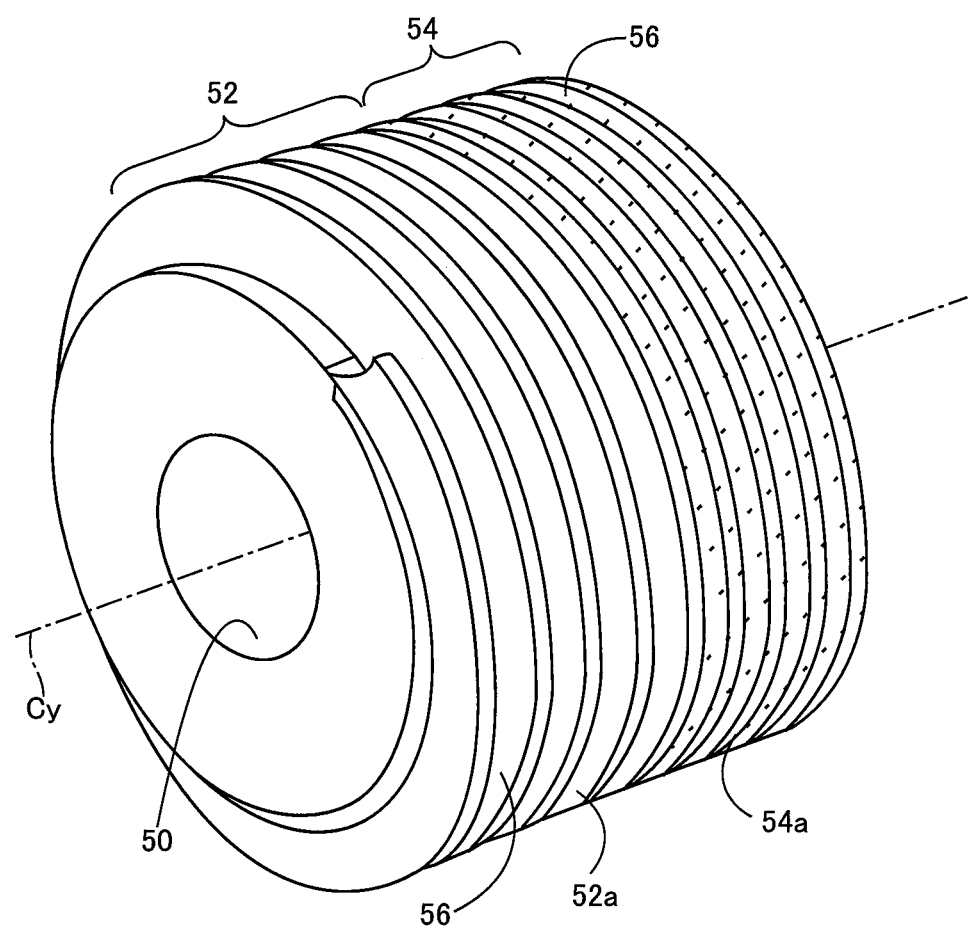
FIG. 3 A perspective view for explaining the gear-grinding multilayer grindstone shown in FIG. 2, by showing the multilayer grindstone in enlargement.

FIG. 3 is a perspective view for explaining the gear-grinding multilayer grindstone 12, by showing the multilayer grindstone 12 in enlargement. As shown in FIG. 3, the gear-grinding multilayer grindstone 12 has a mount hole 50 passing therethrough in the direction of the rotational axis Cy, and is integrally constituted by a rough-machining grindstone portion 52 and a finish-machining grindstone portion 54 that are disposed adjacent to each other on the rotational axis Cy, wherein the rough-machining grindstone portion 52 corresponds to a first thread-shaped grindstone while the finish-machining grindstone portion 54 corresponds to a second thread-shaped grindstone. A thread groove 56 is formed in each of an outer circumferential surface (first outer circumferential surface) 52a of the rough-machining grindstone portion 52 and an outer circumferential surface (second outer circumferential surface) 54a of the finish-machining grindstone portion 54, such that the thread grooves 56 formed in the respective outer circumferential surfaces of the rough-machining and finish-machining grindstone portions 52, 54 are made accurately coincident in phase with each other, so as to cooperate with each other to constitute a single thread groove that extends continuously over the rough-machining and finish-machining grindstone portions 52, 54.

FIG. 4 is a cross sectional view for explaining construction of the gear-grinding multilayer grindstone 12. The gear-grinding multilayer grindstone 12 is constituted with the rough-machining grindstone portion 52 and the finish-machining grindstone portion 54 being fixed at their end surfaces to each other with use of adhesive 58, for example, as shown in FIG. 4. In FIG. 4, the adhesive 58 is represented by thick lines, for easier understanding.

The rough-machining grindstone portion 52 and the finish-machining grindstone portion 54 are different from each other in terms of kind and grain size of abrasive grains, kind and binding degree of a binder, and porosity, for example. Thus, the rough-machining grindstone portion 52 and the finish-machining grindstone portion 54 are different in physical characteristics, so as to enable the gear-grinding multilayer grindstone 12 to perform a machining operation at a high speed while maintaining at a high performance in both of a rough machining operation and a finish machining operation.

The rough-machining grindstone portion 52 has a higher strength than the finish-machining grindstone portion 54, and is constituted by a vitrified grindstone in which, for example, abrasive grains are fixed to each other through a vitreous inorganic binder (vitrified bond). Meanwhile, the finish-machining grindstone portion 54 has a higher elasticity, namely, a lower elastic modulus than the rough-machining grindstone portion 52, and is constituted by an abrasive-cloth laminated grindstone including abrasive cloths 54b which are laminated on each other, for example, in the direction of the rotational axis Cy (i.e., center line about which the grindstone is to be rotated) and which are fixed to each other through the adhesive 58 in which abrasive grains and synthetic resin are mixed, as shown by way of example in the cross sectional view of FIG. 4, wherein the adhesive 58 is applied in a plain in each of the abrasive cloths 54b. In each of the abrasive cloths 54b, the adhesive 58 (in which the abrasive grains and the synthetic resin are mixed) is applied in the plain onto a fibrous substrate sheet consisting of a non-woven fabric or woven fabric that is constituted by at least one kind of fibers selected from among synthetic fibers (such as nylon 6, nylon 66, polyester, polypropylene, acrylonitrile, rayon and cellulose acetate) and natural fibers (such as cotton, wool and hemp).

Further, the abrasive grains of the rough-machining grindstone portion 52 have a grain size of F80 to F180, for example. Meanwhile, the abrasive grains of the finish-machining grindstone portion 54 have a grain size of F220 to F2000, for example, and are finer than the abrasive grains of the rough-machining grindstone portion 52. A ratio of content of the abrasive grains in the finish-machining grindstone portion 54, i.e., an abrasive-grain volume ratio of the finish-machining grindstone portion 54, is 0.5 vol % to 25 vol %, for example. The finish-machining grindstone portion 54 has a lower elastic modulus than the rough-machining grindstone portion 52, and has a bending elastic modulus of 0.05 GPa to 1.2 Gpa, for example.

Hereinafter, there will be described gear grinding tests conducted by the present inventors so as to evaluate influences of the grain size, elastic modulus and abrasive-grain volume ratio, on the roughness. First, samples 1 to 14 having common rough-machining grindstone portions but different finish-machining grindstone portions were prepared as shown in FIG. 5. Then, using the samples 1 to 14, gear grinding operation were performed to grind a work gear with a machining condition shown in FIG. 6, in the continuous-generation gear grinding machine 10, wherein specification of the work gear to be ground is indicated as follows.

| (Specification of Work Gear) | |
| --- | --- |
| Set items in Gear | Set Value |
| Module | 3 |
| Pressure Angle (°) | 20 |
| Number of Teeth | 31 |
| Twist Direction | RH |
| Tooth Tip Diameter (mm) | 105 |
| Tooth Width (mm) | 40 |
| Material | SCM415 |

Figures 6, 7:
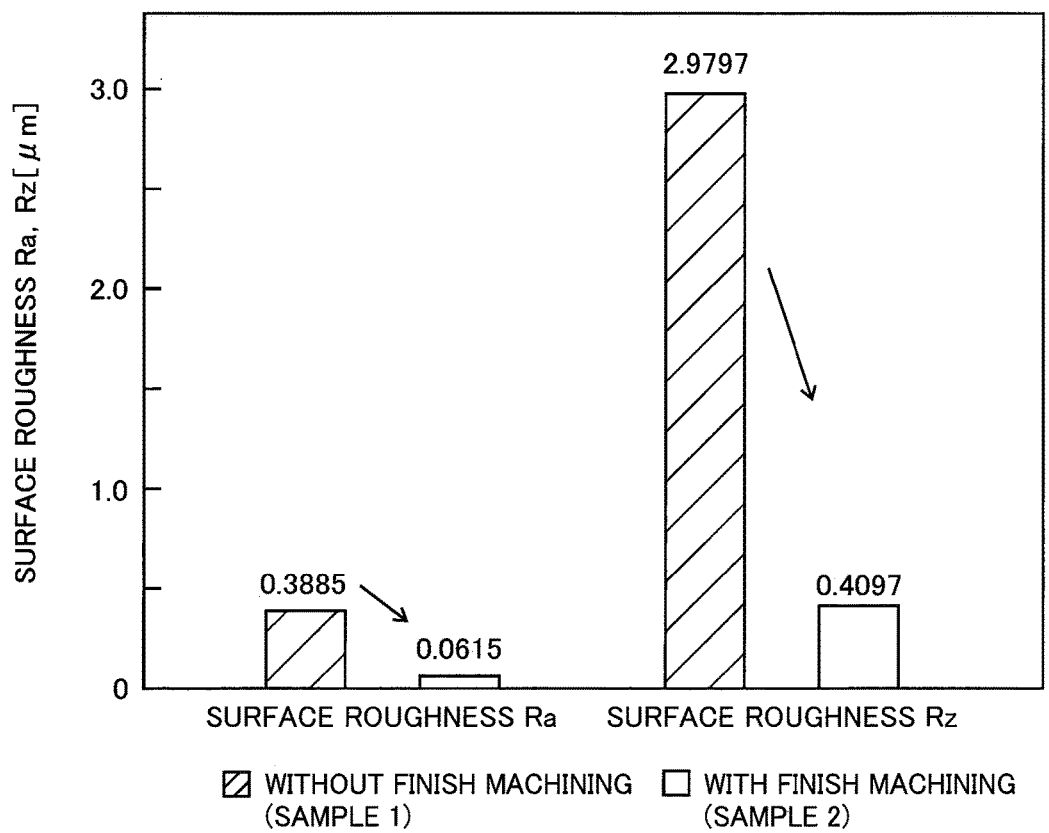
FIG. 6 A view showing machining conditions in the gear grinding tests.
FIG. 7 A graph for comparing a surface roughness of a gear ground by the sample 1 and a surface roughness of a gear ground by the sample 2.

In FIG. 6, "AXIAL GENERATION FEED RATE (mm/t.rev)" represents an amount of movement of the gear-grinding multilayer grindstone 12 in the axial direction (Z-axis direction) during one rotation of the work gear. Further, in the continuous-generation gear grinding machine 10, the gear blank BL is rotated about the rotational axis Cz in a fixed position, while the gear-grinding multilayer grindstone 12 is moved in the direction of the rotational axis Cy. Since the rough machining operation, intermediate finish machining operation and final finish machining operation are different in terms of a position of the gear-grinding multilayer grindstone 12 relative to the gear blank BL for machining the gear blank BL, a cutting depth amount and an axial generation feed rate can be set to values for the rough machining operation, intermediate finish machining operation and final finish machining operation.

In each of the samples 1-14 used in the gear grinding tests, the rough-machining grindstone portion had dimensions of 275 mm (outside diameter)×85 mm (thickness)×150 m (inside diameter), and the finish-machining grindstone portion had dimensions of 275 mm (outside diameter)×40 mm (thickness)×150 m (inside diameter), so that a total thickness was 125 mm. Further, the un-woven fabric used in the abrasive-cloth laminated grindstone constituting the finish-machining grindstone portion was constituted by a non-woven fabric of nylon 66 resin having a fiber diameter of 70 As shown in FIG. 5, the sample 1 was not provided with the finish-machining grindstone portion, and was provided with only the rough-machining grindstone portion. Meanwhile, each of the samples 2-14 was provided with the rough-machining grindstone portion included in the sample 1 and also the corresponding finish-machining grindstone portion, whose specification is shown in FIG. 5.

Regarding the bending elastic modulus that is shown in FIG. 5, a test piece having a width b of 20 mm, a thickness h of 15 mm and a length of 100 mm was prepared for each of the samples 1-14, and was placed on a pair of sample support stands such that a support distance L that is a distance between supported portions of the test piece at which the test piece is supported by the respective sample support stands, is 15 mm. Next, a load member, which positioned at a center between the supported portions of the test piece, is pressed from above against the test piece at a speed of 1 mm/sec, and a change amount ΔF of a bending load of the test piece and a change amount Δs of a deflection of the test piece were measured when the load applied to the test piece corresponded to 25% to 50% of a yield load. Then, from a predetermined 3-point bending-elastic-modulus calculation formula (1), a 3-point bending load was calculated based on the change amount ΔF of the bending load and the change amount Δs of the deflection upon 25% to 50% of the yield load, the support distance L, and the width b and the thickness h of the test piece.

$$3\text{-point bending elastic modulus} = (L^3/4bh^3) \times (\Delta F/\Delta s) \quad (1)$$

Regarding the measurements (JIS B 0601:2013) of the surface roughness Ra (arithmetic mean roughness) and surface roughness Rz (maximum roughness) that are shown FIG. 5 and FIG. 7, SURFCOM 5000 DX (surface roughness measuring device) manufactured by TOKYO SEIMITSU CO., LTD. was used.

In FIG. 5, regarding the surface roughness Ra of the obtained work gear, the samples having the surface roughness Ra of 0.1 μm or less were evaluated as "EXCELLENT", the samples having the surface roughness Ra of 0.2 μm or less were evaluated as "GOOD", and the samples having the surface roughness Ra exceeding 0.2 μm were evaluated as "POOR". As is clear from FIG. 5, the samples 2 and 13 were evaluated as "EXCELLENT", and the samples 4, 5, 8, 9 and 12 were evaluated as "GOOD". Thus, the evaluation of "EXCELLENT" or "GOOD" was given to each of the samples with the grain size of the abrasive grains of the finish-machining grindstone portion being F220 to F2000, the abrasive-grain volume ratio being 1.0 vol % to 20 vol % and the elastic modulus being 0.05 Gpa to 1 Gpa.

Figure 8:
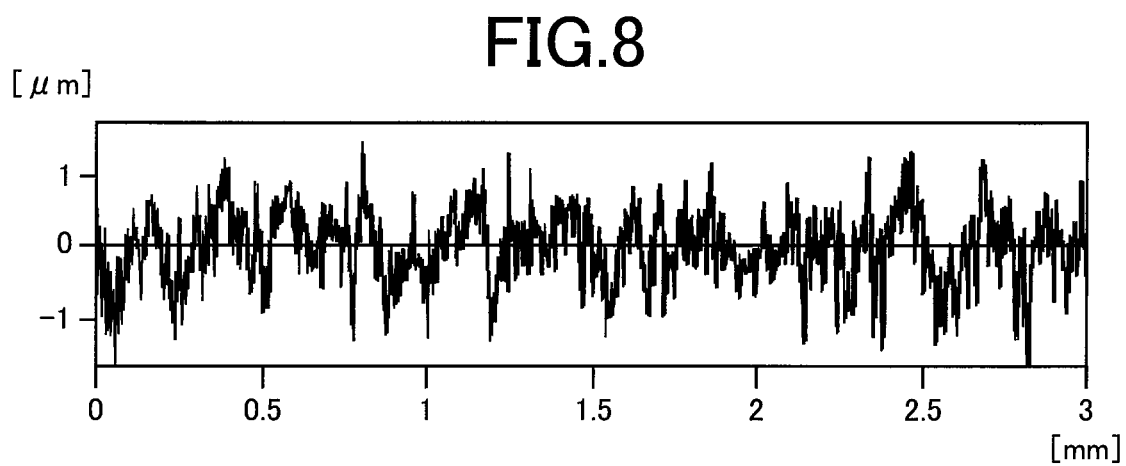
FIG. 8 A view showing a surface profile in measurement of the surface roughness provided by the sample 1.
Figure 9:
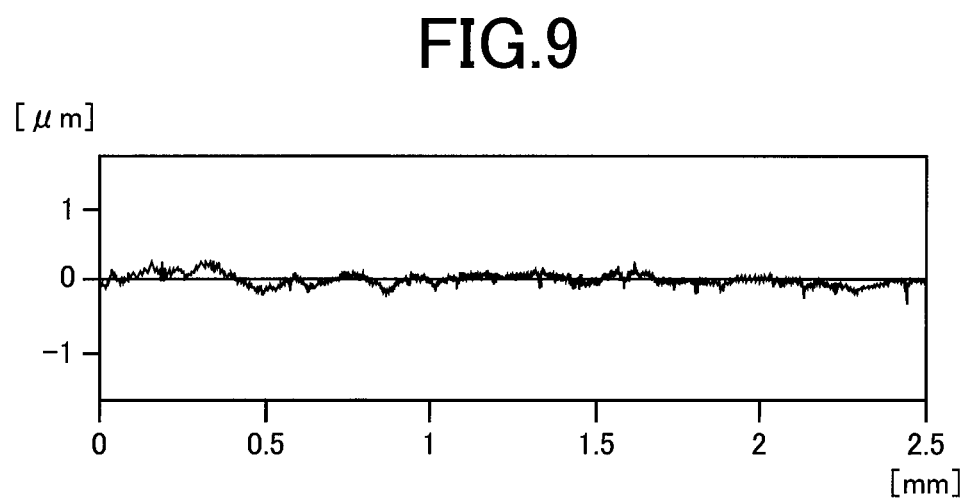
FIG. 9 A view showing a surface profile in measurement of the surface roughness provided by the sample 2.

Regarding the surface roughnesses observed in the gear grinding tests, FIG. 7 is a graph for comparing the surface roughnesses Ra, Rz provided by the sample 1 that does not include the finish-machining grindstone portion and surface roughnesses Ra, Rz provided by the sample 2 that includes the finish-machining grindstone portion. As is clear from FIG. 7, as compared with the sample 1 not including the finish-machining grindstone portion, the sample 2 including the finish-machining grindstone portion reduced the surface roughness Ra from 0.3885 to 0.0615, so as to improve the surface roughness Ra by 84%, and reduced the surface roughness Rz from 2.9797 to 0.4097, so as to improve the surface roughness Rz by 86%. FIG. 8 shows a surface profile in measurement of the surface roughness provided by the sample 1 not including the finish-machining grindstone portion. FIG. 9 shows a surface profile in measurement of the surface roughness provided by the sample 2 including the finish-machining grindstone portion.

From the above-described results, it was confirmed that the displacement amount is absorbed by the finish-machining grindstone portion at a high speed rotation with a peripheral speed of about 3800 m/min, so that a stable finish machining operation can be performed. Further, since the gear-grinding multilayer grindstone includes the rough-machining grindstone portion and the finish-machining grindstone portion that are integral with each other, the final finish machining operation can be stably performed without the machining axis being offset, which could be caused by attachment/detachment of the gear blank BL required in a case where the rough machining operation and the finish machining operation are executed at respective steps that are other than each other. Moreover, it becomes unnecessary to execute an additional machining operation for a finish machining, thereby advantageously eliminating need for a space required for installing, for example, another grinding machine exclusively for the additional machining operation.

As described above, according to the gear-grinding multilayer grindstone 12 of the present embodiment, the gear-grinding multilayer grindstone 12 includes the rough-machining grindstone portion 52 (first thread-shaped grindstone) and the finish-machining grindstone portion 54 (second thread-shaped grindstone) that are fixed to each other, such that the rough-machining grindstone portion 52 and finish-machining grindstone portion 54 have the rotational axis Cy that is common to the rough-machining and finish-machining grindstone portions 52, 54, and the thread-shaped groove 56 that is provided in the outer circumferential surface (first outer circumferential surface) 52a of the rough-machining grindstone portion 52 and the outer circumferential surface (second outer circumferential surface) 54a of the finish-machining grindstone portion 54, such that the thread-shaped groove 56 extends continuously over the outer circumferential surfaces 52a, 54a, wherein the finish-machining grindstone portion 54 is constituted by the abrasive cloths 54b that are laminated on each other, and has the higher elasticity than the rough-machining grindstone portion 52. Owing to this feature, it becomes possible to enable the finish-machining grindstone portion 54 to absorb the influence of the displacement caused by the rotation, without the gear tooth surface being affected by the displacement, even in a high rotational speed range, so as to stabilize the grinding accuracy and the roughness of the gear tooth surface in the grinding operation performed by the finish-machining grindstone portion 54 having the relatively high elasticity in the gear-grinding multilayer grindstone 12, as shown in FIG. 5.

Further, according to the gear-grinding multilayer grindstone 12 of the present embodiment, the rough-machining grindstone portion 52 corresponding to the first thread-shaped grindstone is the vitrified grindstone in which the abrasive grains have the grain size of F80 to F180. Where the gear-grinding multilayer grindstone 12 is used in the continuous-generation gear grinding machine 10, it is possible to reduce length of grinding swarf, so as to facilitate evacuation of the grinding swarf and to suppress grinding burn, by setting the grain size of the abrasive grains of the rough-machining grindstone portion 52, to F80 to F180.

Further, according to the gear-grinding multilayer grindstone 12 of the present embodiment, the finish-machining grindstone portion 54 is the fibrous-substrate laminated grindstone in which the abrasive cloths 54b are laminated on each other in the thickness direction of the abrasive cloths 54b and which are fixed to each other, such that each of the abrasive cloths 54b includes the adhesive 58 in which the synthetic resin and the abrasive grains are mixed. Owing to this feature, the finish-machining grindstone portion 54 has the higher elasticity than the rough-machining grindstone portion 52, and it becomes possible to enable the finish-machining grindstone portion 54 to absorb the influence of the displacement caused by the rotation, without the gear tooth surface being affected by the displacement, even in a high rotational speed range, so as to stabilize the grinding accuracy and the roughness of the gear tooth surface in the grinding operation performed by the finish-machining grindstone portion 54 of the gear-grinding multilayer grindstone 12.

Further, according to the gear-grinding multilayer grindstone 12 of the present embodiment, in each of the abrasive cloths 54b used in the finish-machining grindstone portion 54, the adhesive 58 including the synthetic resin and the abrasive grains is applied to the fibrous substrate sheet that is constituted by at least one kind of fibers selected from among nylon 6, nylon 66, polyester, polypropylene, acrylonitrile, rayon, cellulose acetate, cotton, wool and hemp. With use of the above-described fiber, the inside of the substrate sheet has a three-dimensional network structure in which the fibers are intricately entwined. Thus, even in the finish-machining grindstone portion 54 in which the adhesive 58 is applied to the fibrous substrate sheets and the fibrous substrate sheets are laminated on each other, the three-dimensional network structure of each of the fibrous substrate sheets remains, so that the finish-machining grindstone portion 54 has more pores than the conventional resinoid grindstone. In the conventional resinoid grindstone, there is no pore or a limited number of pores so that the displacement during the gear machining operation is mainly limited to deformation of a resin portion that is a binder. As compared with the conventional resinoid grindstone, the gear-grinding multilayer grindstone 12 as the fibrous-substrate laminated grindstone has a multiplicity of pores, so that the displacement during the gear machining operation can be made by deformation of each of the pores and also deformation of each of the fibrous substrate sheets as such. Therefore, as compared with the resinoid grindstone, the finish-machining grindstone portion 54 has a high elasticity so as to able to absorb the influence of the displacement caused during the rotation at a high speed, without the gear tooth surface being affected by the displacement, so that the roughness of the gear tooth surface is stabilized in the grinding operation performed by the finish-machining grindstone portion 54 of the gear-grinding multilayer grindstone 12. Further, since the finish-machining grindstone portion 54 has the high elasticity than the rough-machining grindstone portion 52, it becomes possible to enable the finish-machining grindstone portion 54 to absorb the influence of the displacement caused by the rotation, without the gear tooth surface being affected by the displacement, even in a high rotational speed range, so as to stabilize the grinding accuracy and the roughness of the gear tooth surface in the grinding operation performed by the finish-machining grindstone portion 54 of the gear-grinding multilayer grindstone 12.

Further, according to the gear-grinding multilayer grindstone 12 of the present embodiment, the synthetic resin included in the adhesive 58 is constituted by one of epoxy resin, urethane resin, phenol resin, melamine resin and acrylic resin. Owing to this feature, the synthetic resin included in the adhesive 58 fixes between the fibrous substrate sheets, thereby making it possible to increase durability.

Further, according to the gear-grinding multilayer grindstone 12 of the present embodiment, the finish-machining grindstone portion 54 is constituted by the abrasive cloths 54b that are laminated on each other in the direction of the rotational axis Cy (i.e., direction parallel to the rotational axis Cy). Owing to this feature, a direction of the fibers in the abrasive cloths 54b included in the finish-machining grindstone portion 54 constituting the gear-grinding multilayer grindstone 12 is a radial direction (i.e., direction perpendicular to the rotational axis Cy), the finish-machining grindstone portion 54 is suppressed from being deformed outwardly in the radial direction, namely, from expanding in the radial direction. Further, owing to this feature, it becomes possible to enable the finish-machining grindstone portion 54 to absorb the influence of the displacement caused by the rotation, without the gear tooth surface being affected by the displacement, even in a high rotational speed range, so as to stabilize the grinding accuracy and the roughness of the gear tooth surface in the grinding operation performed by the finish-machining grindstone portion 54 of the gear-grinding multilayer grindstone 12.

Further, according to the gear-grinding multilayer grindstone 12 of the present embodiment, the abrasive grains of the finish-machining grindstone portion 54 have the grain size of F220 to F2000, and are finer than the abrasive grains of the rough-machining grindstone portion 52. Owing to this feature, the abrasive grains of the finish-machining grindstone portion 54 are finer than the abrasive grains of the rough-machining grindstone portion 52, so that the roughness of the surface of the gear blank BL can be improved. If the grain size is finer than F2000, particularly, if the grain size is finer than F3000, the grinding performance would be reduced.

Further, according to the gear-grinding multilayer grindstone 12 of the present embodiment, the finish-machining grindstone portion 54 has a bending elastic modulus of 0.05 to 1.0 Gpa. Preferably, the bending elastic modulus of the finish-machining grindstone portion 54 is 0.1 to 0.4 Gpa. Owing to this feature, a satisfactory polishing surface can be obtained. If it is smaller than 0.05 Gpa, an amount of escape due to a machining resistance is increased during the machining operation, so that a polishing force could not be exerted. Further, since the strength of the finish-machining grindstone portion 54 is reduced, it is not possible to obtain a grindstone strength required for a peripheral speed used in a high rotational speed range. On the other hand, if it is larger than 1.0 Gpa, the amount of scape due to the machining resistance is made small, a tooth profile portion of the finish-machining grindstone portion 54 could be broken in case of a high machining load.

Further, according to the gear-grinding multilayer grindstone 12 of the present embodiment, the ratio of content of the abrasive grains 54 in the finish-machining grindstone portion 54 is 1.0 to 20 vol %. Owing to this feature, optimum polishing force and elastic modulus can be obtained. If it is smaller than 1 vol %, the number of the abrasive grains acting to machine the gear tooth surface of the gear blank BL is so small that the polishing performance would be insufficient and the gear tooth surface could not be improved. On the other hand, if it is larger than 20 vol %, the ratio of content of the adhesive 58 is made relatively small so that the optimum elastic modulus could not be obtained.

Further, according to the gear-grinding multilayer grindstone 12 of the present embodiment, the gear-grinding multilayer grindstone 12 is to be used in the continuous-generation gear grinding machine 10, and the continuous-generation gear grinding operation is to be executed to form the teeth in the outer circumferential surface of the gear blank BL, by displacing (shifting) the gear-grinding multilayer grindstone 12 in the direction parallel to the rotational axis Cy while rotating the gear-grinding multilayer grindstone 12 about the rotational axis Cy, and performing the reciprocating grinding feed of the gear-grinding multilayer grindstone 12 with a predetermine grinding stroke in the direction parallel to the rotational axis Cz of the gear blank BL while sequentially rotating the gear blank BL about the rotational axis Cz of the gear blank BL, such that rotation of the gear blank BL is synchronized with the reciprocating grinding feed of the gear-grinding multilayer grindstone 12. Owing to this feature, the gear grinding operation can be performed on the gear blank BL with high efficiency and high accuracy.

While the embodiment of the present invention has been described in detail with reference to the drawings, it is to be understood that the invention is not limited to the embodiment but may be embodied also in other forms.

For example, in the gear-grinding multilayer grindstone 12 of the above-described embodiment, each of the rough-machining grindstone portion 52 and the finish-machining grindstone portion 54 is not provided with a core. However, each of the rough-machining grindstone portion 52 and the finish-machining grindstone portion 54 may be provided with a core having a high strength such as a core made of a metal material and a core made of a resin-impregnated vitrified grindstone.

Further, in the above-described embodiment, the rough-machining grindstone portion 52 and the finish-machining grindstone portion 54 are fixed to each other through the adhesive 58. However, the rough-machining grindstone portion 52 and the finish-machining grindstone portion 54 may be fixed to each other in a stage in which the rough-machining and finish-machining grindstone portions 52, 54 are mounted on an output shaft of the grindstone driving motor 40 or on a grindstone spindle that is to be driven by the output shaft, with use of a flange.

Further, in the finish-machining grindstone portion 54 of the gear-grinding multilayer grindstone 12 of the above-described embodiment, the abrasive cloths 54b are laminated on each other in the direction parallel to the rotational axis Cy. However, for example, the abrasive cloths 54b may be laminated on the radial direction, or may be formed long in a ribbon shape and wound so as to be laminated in a spiral shape.

It is to be understood that what has been described above is merely the embodiment of the present invention, and that the present invention may be embodied with various changes and modifications in a range without departing from the spirit of the invention.

DESCRIPTION OF REFERENCE SIGNS

10: continuous-generation gear grinding machine 12: gear-grinding multilayer grindstone 52: rough-machining grindstone portion (first thread-shaped grindstone) 52a: first outer circumferential surface 54: finish-machining grindstone portion (second thread-shaped grindstone) 54a: second outer circumferential surface 54b: abrasive cloth 56: thread-shaped groove 58: adhesive BL: gear blank Cy: rotational axis of grindstone Cz: rotational axis of gear blank

The invention claimed is:

1. A multilayer grindstone for gear grinding, the multilayer grindstone comprising:
a first thread-shaped grindstone and a second thread-shaped grindstone that are fixed to each other, such that the first and second thread-shaped grindstones have a rotational axis that is common to the first and second thread-shaped grindstones; and
a thread-shaped groove that is provided in a first outer circumferential surface of the first thread-shaped grindstone and a second outer circumferential surface of the second thread-shaped grindstone, such that the thread-shaped groove extends continuously over the first outer circumferential surface and the second outer circumferential surface,
wherein the second thread-shaped grindstone is constituted by abrasive cloths that are laminated on each other, and has a higher elasticity than the first thread-shaped grindstone,
abrasive grains of the second thread-shaped grindstone have a grain size of F220 to F2000, and are finer than abrasive grains of the first thread-shaped grindstone,
the second thread-shaped grindstone has a bending elastic modulus of 0.05 to 1.0 Gpa, and
a ratio of content of abrasive grains in the second thread-shaped grindstone is 1.0 to 20 vol %.

2. The multilayer grindstone according to claim 1, wherein the first thread-shaped grindstone is a vitrified grindstone in which abrasive grains have a grain size of F80 to F180.

3. The multilayer grindstone according to claim 1, wherein the second thread-shaped grindstone is a fibrous-substrate laminated grindstone in which the abrasive cloths are laminated on each other in a thickness direction of the abrasive cloths and which are fixed to each other, such that each of the abrasive cloths includes adhesive in which synthetic resin and abrasive grains are mixed.

4. The multilayer grindstone according to claim 3, wherein, in each of the abrasive cloths, the adhesive is applied to a fibrous substrate sheet that is constituted by at least one kind of fibers selected from among nylon 6, nylon 66, polyester, polypropylene, acrylonitrile, rayon, cellulose acetate, cotton, wool and hemp.

5. The multilayer grindstone according to claim 3, wherein the synthetic resin included in the adhesive is constituted by one of epoxy resin, urethane resin, phenol resin, melamine resin and acrylic resin.

6. The multilayer grindstone according to claim 1, wherein the second thread-shaped grindstone is constituted by the abrasive cloths that are laminated on each other in a direction of the rotational axis.

7. The multilayer grindstone according to claim 1, wherein the multilayer grindstone is to be used in a continuous-generation gear grinding operation, and
wherein the continuous-generation gear grinding operation is to be executed to form teeth in an outer circumferential surface of a gear blank, by displacing the multilayer grindstone in a direction of the rotational axis while rotating the multilayer grindstone about the rotational axis, and performing reciprocating grinding feed of the multilayer grindstone in a direction parallel to a rotational axis of the gear blank while sequentially rotating the gear blank about the rotational axis of the gear blank, such that rotation of the gear blank is synchronized with the reciprocating grinding feed of the multilayer grindstone.

8. The multilayer grindstone according to claim 1 wherein the first thread-shaped grindstone is a vitrified grindstone in which abrasive grains have a grain size of F80 to F180,
the second thread-shaped grindstone is a fibrous-substrate laminated grindstone in which the abrasive cloths are laminated on each other in a thickness direction of the abrasive cloths and which are fixed to each other, such that each of the abrasive cloths includes adhesive in which synthetic resin and abrasive grains are mixed, the second thread-shaped grindstone is constituted by the abrasive cloths that are laminated on each other in a direction of the rotational axis, the multilayer grindstone is to be used in a continuous generation gear grinding operation, and the continuous generation gear grinding operation is to be executed to form teeth in an outer circumferential surface of a gear blank, by displacing the multilayer grindstone in a direction of the rotational axis while rotating the multilayer grindstone about the rotational axis, and performing reciprocating grinding feed of the multilayer grindstone in a direction parallel to a rotational axis of the gear blank while sequentially rotating the gear blank about the rotational axis of the gear blank, such that rotation of the gear blank is synchronized with the reciprocating grinding feed of the multilayer grindstone.

\* \* \* \* \*